Sept. 15, 1925.  1,553,647
G. J. THOMAS
BRAKE ACTUATING MEANS
Filed Dec. 23, 1924
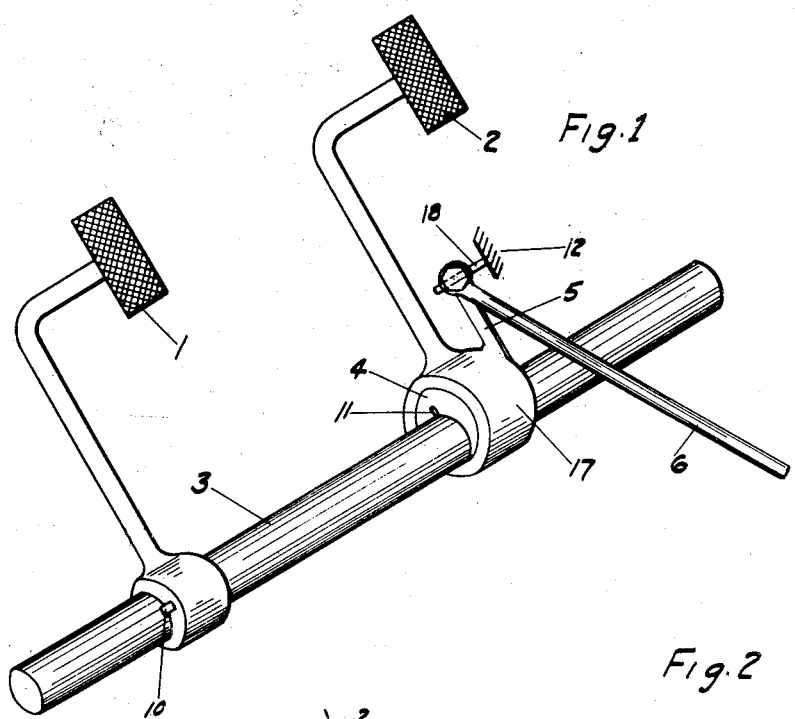
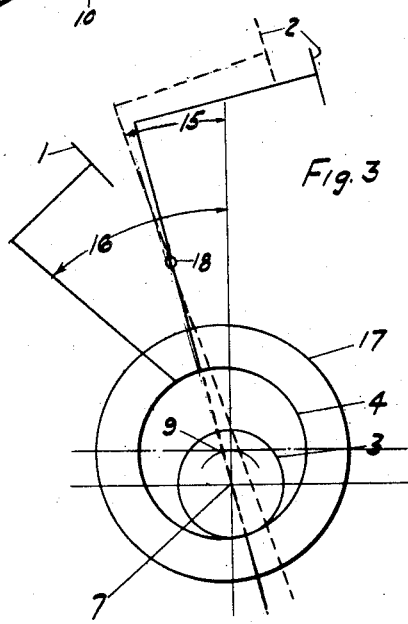
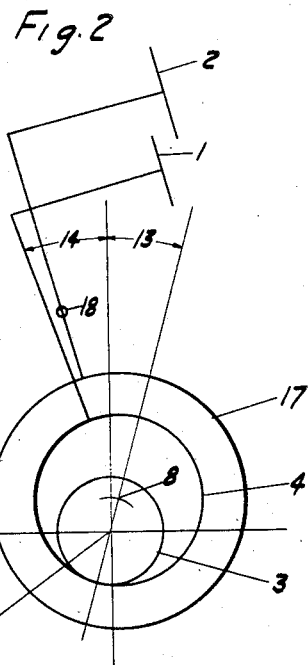
INVENTOR
GEORGE J. THOMAS
BY
*A. D. J. Libby*
ATTORNEY Patented Sept. 15, 1925.

1,553,647

UNITED STATES PATENT OFFICE.

GEORGE JOSEPH THOMAS, OF SOUTH BEND, INDIANA, ASSIGNOR TO BENDIX BRAKE COMPANY, A CORPORATION OF ILLINOIS.

BRAKE-ACTUATING MEANS.

Application filed December 23, 1924. Serial No. 757,593.

*To all whom it may concern:*

Be it known that I, GEORGE J. THOMAS, a citizen of the United States, residing at South Bend, in the county of St. Joseph, State of Indiana, have invented certain new and useful Improvements in Brake-Actuating Means, of which the following is a description, reference being had to the accompanying drawing and to the figures of reference marked thereon.

This invention relates to means for braking a vehicle, particularly, of the automotive type, and especially those which are fitted with brakes on all road wheels.

One of the objects of my invention is to increase the effectiveness of the application of the brake pedal, especially, under emergency conditions when such conditions arise.

Another object of my invention is to provide means for decreasing the slack in the brake connections, thereby enabling the brake pedal to actuate the brakes themselves with a reduction in the travel of the brake pedal itself for a given degree of braking. One of the results of reducing the slack in the braking system is to increase the leverage without decreasing the amount of movement of the brake actuating means which would be the effect of increasing leverage with a fixed pedal travel. It is a well known fact that under normal conditions of operation, a driver of a vehicle will only use a relatively small part of the brake pedal travel to obtain the necessary results, but, that in emergency, the tendency is that the operator will push the brake pedal all the way to the floor board of the vehicle without, in many cases, obtaining adequate braking effect due to the slack and spring in the braking mechanism. It is rather difficult to remedy this trouble without increasing the pedal pressure to a degree which is not only annoying to the driver of a vehicle, but many times extremely tiresome; especially, is this true in the operation of heavy vehicles.

It is, therefore, another object of my invention to provide a braking system in which these difficulties are largely overcome.

My invention will be best understood by reference to the drawings which are diagrammatic in order to better illustrate the invention.

In the drawings, Figure 1 shows a clutch and brake pedal mounted in a manner to illustrate the invention.

Figures 2 and 3 are diagrammatic representations of the operation of the mechanism illustrated in Fig. 1;

Figure 2 shows the mechanism in inoperative position, that is to say, with the brake pedal in its normal position in which the brake is released and the clutch pedal positioned with the clutch engaged while Figure 3 illustrates the clutch pedal in completely disengaged position and showing the effect of this movement on the clutch pedal.

In the various views wherein like numbers refer to corresponding parts, 1 is a clutch pedal fastened to a clutch shaft 3 in any satisfactory manner as by a key 10. 2 is a brake pedal having a portion 17 mounted on an eccentric member 4, that is fastened to the shaft 3 in any satisfactory manner as by a key 11. The portion 17 carries a short lever arm 5 that is connected through the rod 6 to the brake operating mechanism. A stop 18 carried on some stationary portion 12 of the vehicle is placed preferably near the union of the rod 6 with the lever 5 so as to prevent the lever 5 and consequently the brake pedal 2 from moving in a clockwise direction when the brakes are in full released position.

As shown in Fig. 2 the clutch pedal makes an angle 14 with a vertical line through the center 7 of the clutch shaft 3, while the center of the eccentric member 4 is at the point 8 on a line making an angle 13 with said vertical line through the center 7 of the clutch shaft 3; now if the clutch shaft 3 be moved from its normal position, as shown in Fig. 2, to its completely released position, as shown in Fig. 3, making an angle designated 16, between the clutch pedal and the vertical line of the center 7 of the clutch shaft 3, the center of the eccentric will move from the point 8 of Fig. 2 to the point 9 shown in Fig. 3. It is obvious from the drawing that the point 18 must remain stationary when such movement takes place so that there will be no tendency for the brakes to be applied when the brakes are released and the stop 18 then becomes a virtual center about which the brake pedal arm may rotate when the clutch shaft rotates. The movement of the brake pedal 2, when the clutch pedal 1 is rotated, as above described, will be from the position shown by the dotted line in Fig. 3 to the position shown in full lines thereby resulting in an increased allowable travel for the brake pedal as clearly indicated in Fig. 3. In a normal length of pedal this movement may approximate one inch of the brake pedal for a quarter inch throw of the eccentric, which, of course, may be increased, thus enlarging the effective travel of the brake pedal when the clutch is released by proportionate amounts. For all normal conditions of braking the clutch remains in its engaged position and the brake pedal 2 is operated independently of the clutch pedal 1. The arrangement is such as to give an easy action of the brakes with moderate pedal travel. In cases of emergency it is usually customary for the driver to completely release the clutch and at the same time apply the brakes and under this condition of operation the effective travel of the brake pedal will be increased as has been pointed out by a proportionate amount due to the movement of the eccentric 4: thus, the driver will be able to give a maximum brake application due to the increased travel of the brake pedal.

It is to be understood that the eccentric 4 may take some other form than that shown, for example; it may take the form of a single throw crank of convenient size formed or connected in as part of the clutch shaft, the brake pedal being mounted on the crank; consequently, I do not wish to be unduly limited in the scope of my invention.

Having thus described my invention what I claim is:

1. In combination, a clutch shaft having a clutch pedal fixed thereto, an eccentric carried on said shaft, a brake actuating lever revolubly mounted on said eccentric, a member fixed to said lever and connected to the brakes and means for causing said lever to shift its position on said eccentric on actuation of said clutch pedal for the purpose described.

2. In combination, a clutch shaft having a clutch pedal fixed thereto, an eccentric carried on said shaft, a brake actuating lever revolubly mounted on said eccentric, a member fixed to said lever and connected to the brakes and a stop acting on said lever so as to act as a virtual center about which said lever rotates on the eccentric as said clutch pedal is operated whereby said pedal is moved in a direction opposite to that in which it moves when the brakes are applied.

3. In combination, a clutch shaft having a clutch pedal fixed thereto and brake actuating means with means for increasing the effectiveness of the brakes comprising; an eccentric carried on said shaft, and supporting said brake actuating means, with cooperating means for moving said actuating means about the eccentric so as to increase the travel of the brake actuating means on actuation of the clutch.

4. In combination, a clutch shaft having a clutch pedal fixed thereto, a single throw device on said shaft, a brake actuating member revolubly mounted on said device and means for causing said member to shift its position on said device on actuation of said clutch pedal for the purpose described.

5. In a vehicle having a clutch and brakes, with actuating means therefor, means for increasing the effectiveness of the brakes by increasing the range of movement of the brake actuating means on actuation of the clutch actuating means.

6. In a vehicle having a clutch and brakes, with separate actuating means for each carried on a common shaft and means associated with said shaft for increasing the travel of the brake actuating means when the clutch actuating means is operated.

7. In a vehicle having a clutch and brakes, with separate actuating means for each carried on a common shaft so the clutch or the brakes may be operated independently to give normal results but when both are operated simultaneously the clutch actuating means shifts the brake actuation means to provide a longer range of movement thereof for the purpose described.

In testimony whereof I affix my signature.

GEORGE JOSEPH THOMAS.